Aug. 2, 1966 J. A. VAN EYNDE ETAL 3,264,412

FIELD TELEPHONE SYSTEM

Filed Jan. 30, 1963 3 Sheets-Sheet 1

FIELD TELEPHONE SYSTEM

Filed Jan. 30, 1963 3 Sheets-Sheet 2

FIELD TELEPHONE SYSTEM

Filed Jan. 30, 1963 3 Sheets-Sheet 3

United States Patent Office 3,264,412
Patented August 2, 1966

3,264,412

FIELD TELEPHONE SYSTEM

Jozef Auguste Van Eynde, Victor Arcangiolo Marcel Maggini, and Herman Frans Paul Willem Van Horen, Antwerp, Belgium, assignors to International Standard Electric Corporation Filed Jan. 30, 1963, Ser. No. 255,051
Claims priority, application Belgium, Feb. 12, 1962, 613,770
8 Claims. (Cl. 179—6)

Figure 2:
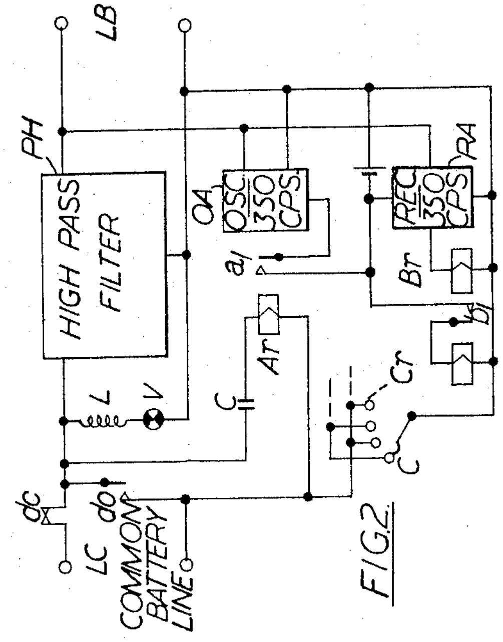

The invention relates to a field telephone system and more particularly to a system of the type using some transistorized telephone subsets having voice frequency ringers and some conventional subsets.

For telephone systems using switchboards associated to transistorized subsets, there is the problem of connecting subsets of another type, either local battery subsets as the transistorized subsets considered above, or also central battery subsets. This problem arises due to the fact that these transistorized subsets use a V.F. calling oscillator, e.g. 350 c./s., whereas conventional subsets are adapted to a low frequency ringing current such as 16 c./s.

An object of the invention is to realize a converter for a field telephone system comprising a switchboard associated with transistorized subsets using a voice frequency to notify or terminate the communications, in order to ensure connections between these subsets and other conventional subsets, either with local or central battery.

Another object of the invention consists in a modification of a transistorized circuit of such a subset in order to permit remote control of a radio transmitter-receiver with the help of a D.C. signal.

Another object of the invention relates to a tuned receiver using transistors and consuming only a very reduced amount of energy, this tuned receiver being destined to supervise a communication between two substations and to receive the ringing current indicating the end of the communication.

Another object of the invention relates to an improvement of the hermetic protection system for push-buttons used on subsets.

Yet another object of the invention consists in realizing a simple and efficient system preventing the insertion of feeding batteries, such as the dry batteries of a local battery subset, with the undesired polarity.

In accordance with a characteristic of the invention, a converter for a field telephone system comprising field telephone subsets provided with a voice frequency ringing oscillator, as well as conventional telephone subsets operating either with central or with local battery but using low frequency ringing current, is characterized by the fact that it comprises a high pass filter which intervenes in the connection between two subsets using the two types of ringing current, this high pass filter being in parallel with a shunt control circuit comprising a first receiver tuned on said low frequency and whose input is normally branched on one side of the high pass filter, a second receiver tuned on said voice frequency and whose input is normally branched on the other side of the high pass filter, and a voice frequency oscillator which is started, and whose output is branched on the input of said second receiver, upon the operation of said first receiver.

In accordance with another characteristic of the invention, the converter circuit adapted to interconnect a voice frequency ringing current subset with a central battery subset whose ringing current is at a low frequency, is characterized by the fact that upon the receipt of the low frequency ringing current by said first tuned receiver, and which entails the starting of the voice frequency oscillator part of said converter, the voice frequency ringing signal transmitted in the direction of the corresponding subset is also received by the second receiver whose input is permanently branched on the output of the voice frequency oscillator and the operation of said second receiver causing as a result the closure of a D.C. loop for the central battery subset circuit.

In accordance with another characteristic of the invention, a telephone subset comprising a voice frequency ringing oscillator provided with an output transformer and with an operating key for said oscillator as well as with a second key for rendering a microphone current amplifier operative, is characterized by the fact that upon the operation of the first key to place the ringing oscillator into service at the calling subset, the secondary winding of said transformer is branched on the line in series with a resistance and at least a contact of the said first key, while upon the second key being operated, the said secondary winding is branched on the line in series with at least a contact of the said second key and without going through said resistance.

In accordance with another characteristic of the invention, a tuned receiver permitting the supervision of a conversation between two subsets of a field telephone system, is characterized by the fact that it comprises a first transistor operating as ringing frequency amplifier, followed by an A.C. current rectifier system whose output is branched in the base-emitter circuit of a second transistor whose collector-emitter output circuit is coupled to the base-emitter input circuit of a third transistor of opposite conductivity to the second and whose output circuit comprises a relay or a visual indicator.

In accordance with another characteristic of the invention, a protection system for push-buttons to render them impervious to any outside agent and comprising a flexible membrane hermetically covering the space in which said push-button is housed, is characterized by the fact that said membrane comprises a solid central part destined to act upon said push-button and a relatively thin part surrounding the central part and fixed on the outside cover of the apparatus in which said push-button is housed, so as to preserve a fold all around the central part.

In accordance with yet another characteristic of the invention, a casing for dry batteries provided with an electrode having a distinct shape at each end is characterized by the fact that it is provided with a cavity in the base of the housing which can accommodate only one of the battery electrodes and that electrical contacts are fixed to said casing and to its cover in such a way that the battery current may flow through said contacts when the cover is closed but that this cover cannot be closed when the batteries are inserted in the wrong way thus preventing the flow of said current.

Figure 1:
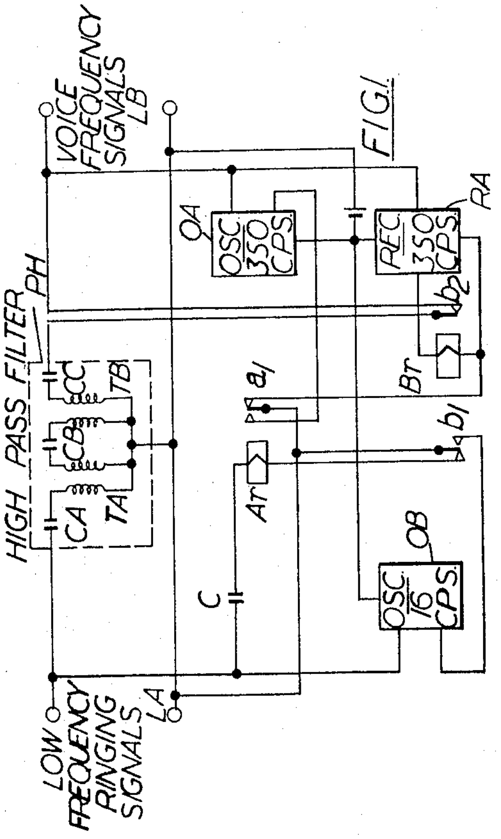
Figure 3:
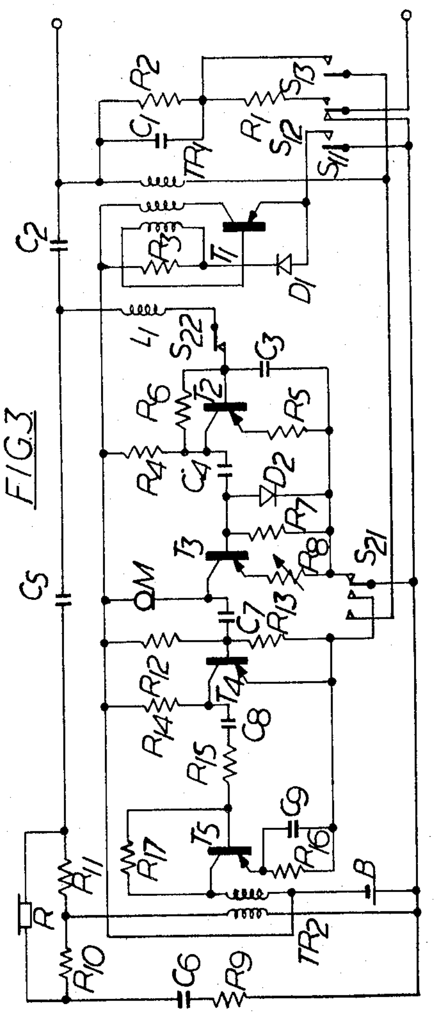
Figure 4:
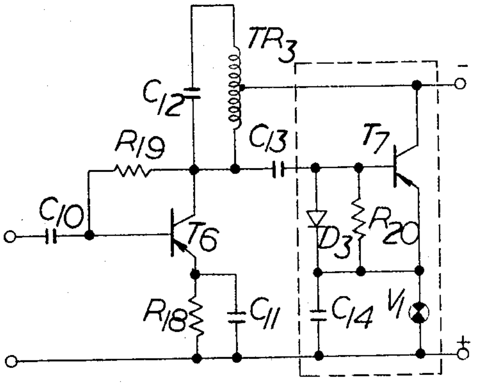
Figure 5:
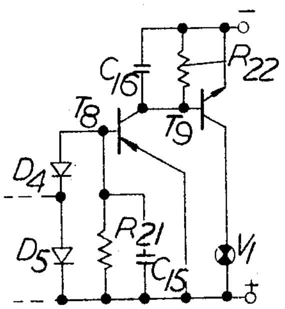
Figure 8:
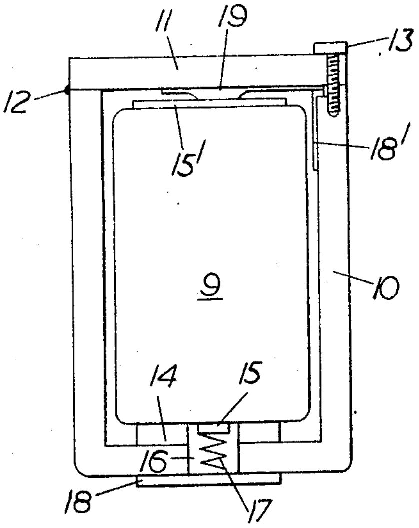
Figure 6:
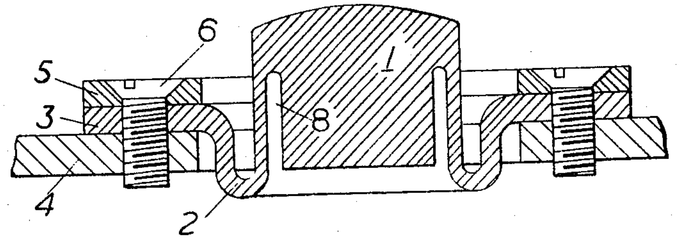
Figure 7:
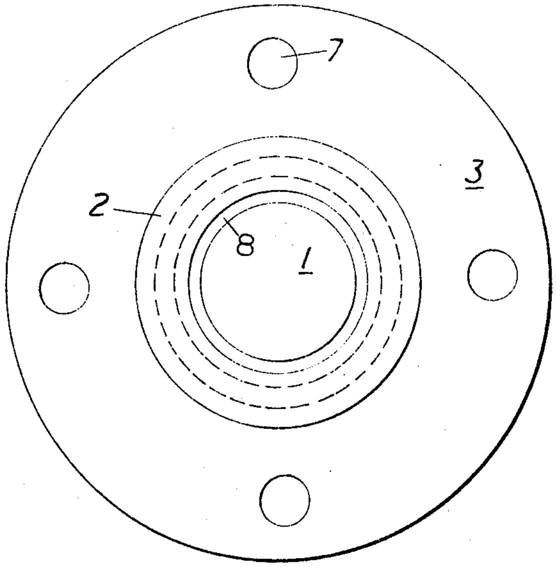

The above and other objects and characteristics of the invention will become more apparent from the following detailed description of preferred embodiments of the invention and to be read in relation with the accompanying drawings and which represent:

FIG. 1, a converter circuit for a field telephone system and permitting to connect two subsets using different ringring curents, one at low frequency and the other at a voice frequency, the subset using the low frequency ringing current being a local battery subset as well as the subset using a voice frequency ringing current;

FIG. 2, a converter circuit for a field telephone system permitting to connect two telephone subsets using different ringing currents, one at low frequency and the other at a voice frequency, the subset whose ringing current is at low frequency working with a central battery;

FIG. 3, the circuit of a transistorized telephone subset for a field telephone system;

FIG. 4, a tuned receiver permitting the operation of a relay or of an indicator and destined for a field telephone system;

FIG. 5, a modification of the circuit of FIG. 4;

FIG. 6, a cross sectional view of a push button protection system for a field telephone subset and ensuring water-tightness;

FIG. 7, a plan view of the protecting cap in flexible material shown in FIG. 6 and FIG. 8, a casing for dry batteries avoiding insertions with reversed polarities.

By referring to FIG. 1, the latter represents a converter permitting to connect a local battery line LA using low frequency ringing signals, e.g. from 16 to 25 c./s. and having an amplitude of 90 v. peak to peak, with a local battery line LB connected to a subset using a voice frequency as ringing current, e.g. at the level of 0 dbm. As shown in FIG. 1, the two lines are connected by a high pass filter comprising a series capacitor CA on the side of the line LA using a low frequency ringing current, followed by a first shunt transformer TA, by a second series capacitor CB, by a second shunt transformer TB and finally by a third series capacitor CC going towards the line LB using the voice frequency ringing current. As shown by the figure, the filter is of the type which is unbalanced with respect to ground, the two lines having a common terminal.

Upon a call on line LA, the ringing current at 16 c./s. is sent into the selective receiver comprising the A.C. relay *Ar* in series with capacitor C, these two elements being branched on line LA by means of the change-over contact $b_1$ of relay B*r* in its normal position. The operation of relay *Ar* has for effect to apply the positive pole of the converter feeding battery, permanently connected to the common terminal of LA and LB, to the 350 c./s. electronic oscillator OA. This application of the positive pole to the oscillator OA is made by means of the change-over contact $a_1$ in its operated position, the displacement of this contact interrupting the connection between the positive pole of the battery and the selective receiver RA reaction to a call using a ringing current at 350 c./s. As indicated by FIG. 1, the negative pole of the battery is permanently applied to oscillator OA, to the receiver RA, as well as to the low frequency electronic oscillator OB designed to provide a ringing current at 16 c./s. Due to the operation of relay *Ar* upon receipt of a call issued from line LA, the oscillator OA thus sends a 350 c./s. signal on line LB and receiver RA cannot react to this signal, its positive feed having been cut.

On the other hand, if a call originates from line LB, the ringing current at 350 c./s. characterizing such a call will be received by the selective receiver RA which will react by the operation of relay B*r* included in this receiver. The operation of relay B*r* will cause the connection of the positive pole of the battery to the oscillator OB, by means of the change-over contact $b_1$ in its working position. In this way the call at 350 c./s. on line LB will be transformed into a call at 16 c./s. on line LA. The operation of relay B*r* interrupts the circuit of relay *Ar* which can no longer react to the signal of 16 c./s. appearing on line LA.

The high pass filter PH is destined to permit the passage of speech currents between the lines LA and LB while eliminating the ringing currents at 16 and 350 c./s. However, in order to facilitate the realization of such a filter, it may be advantageous as indicated by FIG. 1 to interrupt the connection between filter PH and line LB during the operation of relay B*r* reacting to the 350 c./s. current in order to facilitate the realization of filter PH.

The clearing signal given by the subset connected to line LB will also be a 350 c./s. signal causing the operation of relay B*r* with the same effects as previously described.

Oscillator OA may be of the same type as that which will be described in relation with the subset connected to line LB and the circuit of which is represented at FIG. 3. Oscillator OB may be a D.C./A.C. converter using two transistors. The selective receiver RA may be of the type which will be described later in connection with FIGS. 4 and 5.

FIG. 2 represents the ringing current converter in case line LB connected to a subset using a 350 c./s. ringing current is to be connected to a central battery line either automatically or manually, by using a ringing current of the order of 16 c./s. FIG. 2 shows that such a central battery line LC may also be connected to line LB by a high pass filter PH in the converter, but the connection between the common wires of lines LC and LB is normally interrupted. Moreover, the upper conductor of line LC is connected to filter PH by means of a normally closed dial pulse contact as indicated.

As LA at FIG. 1, line LC is branched by means of the dial pulse contact on the 16 c./s. selective receiver formed by the A.C. relay *Ar* in series with condenser C. The positive pole of the battery is connected to the lower conductor of line LB as in FIG. 1 and this time it is applied permanently for the feeding of the oscillator OA at 350 c./s. and for that of the receiver RA selective at the same frequency. But while the negative pole of the converter battery is applied permanently to this receiver RA, it will only reach oscillator OA through make contact $a_1$ of relay *Ar*. The 350 c./s. oscillator OA will thus be started as previously at the receipt of a 16 c./s. call on line LC but while sending a ringing current corresponding to 350 c./s. on line LB, this same current will be received in receiver RA which will cause the operation of relay B*r* and then by means of make contact $b_1$, the operation of magnet C*r*. This magnet C*r* controls an armature *c* being able to occupy various positions in its arc and in the classical way, this step-by-step switch magnet C*r* operates the displacement of its armature towards the next terminal of its arc at the release of the control electromagnet C*r*. As soon as the 16 c./s. ringing signal disappears, relay *Ar* falls off, the operation of oscillator OA is stopped, relays B*r* and C*r* releasing successively which displaces wiper *c* from its position shown at FIG. 2 towards the second terminal of its arc. At this moment, a D.C. connection is established by the converter for the calling line LC through the dial contact *dc*, coil L, indicator V and wiper *c* in its second position. This gives a visual indication to the operator to indicate that line LC is held.

When it concerns a 350 c./s. call originating from line LB, the operations are exactly the same as those described for a call originating from LC with the exception of the operation of relay *Ar* and the putting into service of oscillator OA.

When the 350 c./s. signal appears at the terminals of line LB to indicate the end of a communication, the relays B*r* and C*r* will again be operated and after the release of C*r*, wiper *c* will be put in the third position of its arc interrupting the D.C. loop on LC. It will be noted that the even and odd terminals in the *c* arc are respectively multiplied with one another. The step-by-step switch constitutes a simple means to realize a binary counter. The multipling between the odd terminals being connected to the positive pole of the feeding source when *c* is on one of these terminals, it may be used to signal the circuit condition.

The selecting pulses on line LC will be sent by means of the pulse contact *dc*, contact *do* being also a dial contact which is closed to isolate line LC from the converter as soon as the dial rotates.

FIG. 3 represents the complete schematic of a light field telephone subset using five transistors. The first transistor $T_1$ is the active element of an oscillator of the type described in the U.S. Patent No. 2,896,170 issued to T. Grewe and assigned to the assignee of this invention. This type of oscillator is used to produce a ringing current of 350 c./s. Transistors $T_2$ and $T_3$ mounted in cascade constitute the active elements of an amplifier for the ringing current received at the subset serviced by lines LB shown at FIG. 1, this amplified ringing current being destined to be reproduced by the magnetic microphone M. Finally the transistors $T_4$ and $T_5$ in cascade constitute the active elements of a speech current amplifier for microphone M.

The signalling oscillator comprising transistor $T_1$ will first of all be described as well as its method of operation. The emitter of $T_1$ may be connected to the positive pole of the local battery B by means of make contact $s_{11}$ pertaining to key $S_1$ which is not represented at FIG. 1, said key $S_1$ having to be operated to start a call. By the same operation of this key, the lower line conductor which was normally connected to the positive pole of battery B by means of the changeover contact $s_{12}$ in its rest position will now be connected to the lower end of the output winding of transformer $TR_1$ permitting to use transistor $T_1$ as oscillator. This connection will be carried out through series resistance $R_1$ and by means of the make contact $s_{13}$ also controlled by key $S_1$. This make contact of $s_{13}$ will also connect a tuned condenser $C_1$ on the output winding of transformer $TR_1$, this tuned condenser $C_1$ being bypassed permanently by the damping resistance $R_2$. Transformer $TR_1$ includes a winding an end of which is connected to the collector of $T_1$ while the other end is directly connected to the negative pole of the battery B. A third winding mounted on transformer $TR_1$ permits the operation as oscillator and is connected on the one hand to the base of $T_1$ and on the other hand to the junction point of resistance $R_3$ and of the germanium diode $D_1$ the other ends of which are connected respectively to the negative pole of battery B and to the emitter of transistor $T_1$. Biassed in the conductive sense as soon as key $S_1$ operates as shown on FIG. 1, this diode $D_1$ and resistance $R_3$ are used to bias the base of transistor $T_1$ which together with the other transistors, is of the PNP type and may be fed by the 3-volt battery B.

As soon as key $S_1$ operates transistor $T_1$ will thus be energized by battery B and will oscillate at a 350 c./s. frequency to produce a signal at the terminals of the output winding of transformer $TR_1$ which signal will be applied to the line conductors by means of the series resistance $R_1$.

At the called subset, supposing it is of exactly the same type as the calling subset serviced by line LB as shown on FIG. 1, a calling signal of 350 c./s. applied between the line conductors will be received by the calling current amplifier comprising transistors $T_2$ and $T_3$. Indeed, the upper line conductor is connected to the base of $T_2$ by means of a D.C. blocking series condenser $C_2$ and by a low pass filter comprising the series inductance $L_1$ connected to the base of $T_2$ by the break contact $s_{22}$ of key $S_2$ (not shown); a shunt condenser $C_3$ constitutes the other element of the low pass filter connecting the base of transistor $T_2$ to the second line wire by means of the changeover contact $s_{21}$ of key $S_2$ in its rest position, in series with the changeover contact $s_{12}$ of key $S_1$ also in its rest condition. This low pass filter comprising the inductance $L_1$ and condenser $C_3$ is destined to give passage only to the 350 c./s. calling frequency. The latter will be amplified by transistor $T_2$ the collector and emitter of which are respectively connected to the negative and positive poles of B by means of resistances $R_4$ and $R_5$, a resistance $R_6$ between the collector and the base of $T_2$ ensuring the biasing of the latter. The collector of transistor $T_2$ is connected to the base of transistor $T_3$ by the series condenser $C_4$ while the base of transistor $T_3$ is also connected to the positive pole of battery B by means of the diode $D_2$ biased as indicated, the resistance $R_7$ in shunt across this diode ensuring a base biasing for transistor $T_3$ the collector and emitter of which are respectively connected to the negative and positive poles of battery B by means of the microphone M and the variable resistance $R_8$. The coupling circuit between the collector of transistor $T_2$ and the base of transistor $T_3$ permits to produce a limiting effect which will distort the 350 c./s. calling signal and will produce harmonics which will be detected by the microphone, the variable resistance $R_8$ being used to adjust the acoustical intensity of the received calling signal. Due to the limitation, the acoustic level becomes only slightly dependent on the length of the line. The microphone M operating as calling acoustic receiver is a magnetic microphone of the balanced armature type.

This same type of transducer with balanced armature may also be used for receiver R serving to receive the conversations. The latter will be received by receiver R from the line conductors which are connected to an antiside tone circuit in the form of a Wheatstone bridge of the type described in the U.S. Patent No. 2,838,612. The line which forms one of the six branches of this circuit is connected on the one hand by condenser $C_2$ in series with condenser $C_5$ and on the other hand to the positive pole of battery B by means of the changeover contact $s_{12}$ in its rest position. The line balancing network is constituted by the resistance $R_9$ in series with condenser $C_6$ which just as condenser $C_5$ prevents the passage of D.C. current. While one end of resistor $R_9$ is also connected to the positive pole of battery B, the end of condenser $C_6$ which is not connected to resistance $R_9$ is directly connected to that of condenser $C_5$ which is not connected to condenser $C_2$ through the receiving branch comprising receiver R, the fourth and fifth branches of the bridge being constituted by the series resistances $R_{10}$ and $R_{11}$ in shunt on R the common point of these resistances being connected to the positive pole of battery B by the sixth branch of the bridge and more precisely through a winding of transformer $TR_2$.

This transformer $TR_2$ constitutes the output transformer of the transmission amplifier comprising the transistors $T_4$ and $T_5$, said transmission amplifier being necessary due to the use as transmitter M of the magnetic transducer of the balanced armature type which for this use is much less sensitive than the usual carbon microphones. On the other hand, the use of such a transducer as microphone presents the advantage of eliminating all the drawbacks due to ageing of the carbon granules and permits a relatively easy adjustment of the response curve.

If it is desired to speak, the operation of key $S_2$ will have for effect to displace the changeover contact $s_{21}$ and by leaving the rest position, the armature of contact $s_{21}$ will interrupt the feeding of the amplifier comprising the transistors $T_2$ and $T_3$. On the other hand, via its double make contact the armature of $s_{21}$ will put into operation the transmission amplifier comprising transistor $T_4$ and $T_5$ by coupling the emitters of these transistors to the positive pole of battery B as well as to the lower line conductor through the changeover contact $s_{12}$ in its rest position, the output winding of transformer $TR_1$ being now branched between the line conductors.

The microphone M connected between the negative pole of battery B and the collector of transistor $T_3$ applies its signals to the base of transistor $T_4$ by means of condenser $C_7$ connecting the base of transistor $T_4$ to the collector of transistor $T_3$, the resistances $R_{12}$ and $R_{13}$ branched in series between the negative pole of B and the emitter of $T_4$ directly connected to $s_{21}$ constituting a potentiometer, the tapping point of which connected to the base of transistor $T_4$ permits to bias this transistor whose collector is connected to the negative pole of battery B by resistance $R_{14}$. The collector of transistor $T_4$ is coupled to the base of transistor $T_5$ through condenser $C_8$ in series with the resistance $R_{15}$ the collector and the emitter of transistor $T_5$ being respectively connected to the negative pole of battery B and to contact $s_{21}$ by means of the primary winding of the output transformer $TR_2$ and the resistance $R_{16}$ which in conjunction with resistance $R_{17}$ connecting the collector of $T_5$ to its base, is used as voltage stabilizer for transistor $T_5$. Finally, the condenser $C_9$ in shunt on resistance $R_{16}$ ensures a decoupling for the A.C. currents. In this way, the speech currents produced by microphone M are amplified by transistors $T_4$ and $T_5$ and sent to the line conductor via the output transformer $TR_2$ by means of the bridge type antiside tone circuit described above.

As previously described, upon energizing key $S_2$ when it is desired to speak, this will not only have for effect to cause the energization of the transmission amplifier, but the branching of the output winding of transformer $TR_1$ of the oscillator producing the ringing current in shunt on the line conductors will loop the conductors for D.C. current thus providing a useful signalization particularly to operate a remote control system of a radio emitter receiver which can be associated to the switchboard to which the subsets of FIG. 1 are connected.

When emitting ringing current by the operation of $S_1$, $S_2$ being in the rest condition, the internal resistance of the batteries B is sufficiently large to permit the calling subscriber to hear via M the ringing tone produced by transistor $T_1$ and reaching the microphone via transistor $T_3$.

FIG. 4 represents a selective receiver which may be branched to the switchboard to which the subsets of FIG. 3 are connected as well as the converters of the type shown in FIGS. 1 or 2 in order to permit an operator to supervise a communication and to detect the end of the latter characterized by the sending of ringing current at 350 c./s. FIG. 4 indicates that this ringing current will be transmitted by condenser $C_{10}$ to the base of a PNP transistor $T_6$ constituting the active element of a tuned amplifier and having its collector connected to the negative battery voltage by a part of the coil winding $TR_3$ and its emitter connected to the positive pole of the supply by resistance $R_{18}$ bypassed by condenser $C_{11}$, the base of transistor $T_6$ being biased by the resistance $R_{19}$ connecting it to its collector. A condenser $C_{12}$ is branched on the whole of the coiling $TR_3$ to ensure tuning at the frequency of 350 c./s. An amplified signal at this frequency appearing at the collector of transistor $T_6$ is coupled via condenser $C_{13}$ to a detecting and D.C. amplifying system destined to operate indicator $V_1$. The latter is branched between the positive pole of the supply and the emitter of the PNP transistor $T_7$ whose collector is directly connected to the negative pole of the supply, the base of transistor $T_7$ connected to one of the plates of condenser $C_{13}$ being connected to the emitter of $T_7$ via rectifier $D_3$ bypassed by resistance $R_{20}$ the indicator $V_1$ being bypassed by condenser $C_{14}$. This indicator $V_1$ will thus be operated at the receipt of the 350 c./s. signal.

FIG. 5 represents a modification of the circuit of FIG. 4 permitting an increased sensitivity, a still more reduced consumption and an increased operation margin in relation to temperature variations. The signal amplified by transistor $T_6$ is now coupled to the junction points of two rectifiers $D_4$ and $D_5$ branched as indicated between the base of a PNP transistor $T_8$ and its emitter connected to the positive supply pole. These two rectifiers in conjunction with condenser $C_{15}$ branched between the base and the emitter of transistor $T_8$ as well as resistance $R_{21}$ permit to obtain a rectified voltage which will render the base of $T_8$ more negative than its emitter at the receipt of the 350 c./s. signal which will cause complete conductivity of transistor $T_8$ whose collector potential will tend towards that of its emitter and thus develop a voltage between the base and the emitter of the NPN transistor $T_9$ so as to render this latter transistor conductive, its base being coupled to the collector of transistor $T_8$ and its emitter being connected to the negative pole of the supply while its collector is coupled to the positive pole through the indicator $V_1$.

FIG. 6 represents a protective cap for the push-buttons, but offering more resiliency than the previous device. The coating in plastic material of which FIG. 6 shows a cross-sectional view comprises a central cylindrical part 1 and a circular part surrounding the central part and sufficiently supple to permit a fold 2 as indicated, the outside crown 3 being placed on the frame 4 and fixed to the latter by means of a circular ring 5 provided with holes in which pass screws 6 traversing holes 7 provided in part 3 of the coating in plastic material.

FIG. 7 represents a lower plan view of the coating in plastic material.

In this manner, the central part 1 which is destined to act on the push-button (not shown) permits a sufficient amount of play to ensure a good operation while keeping the required insulation.

FIG. 8 represents an improved housing system for the feeding batteries, such as two dry batteries of 1.5 volts destined to feed the circuits of the subsets such as represented on FIG. 3 or also the oscillators such as OA and OB of FIG. 1 and the selective receivers such as RA. As indicated by FIG. 8, the housing for the dry batteries 9 comprises a casing 10 represented in sectional view and provided with a lid 11 which can be closed around the hinge 12, a thumb screw 13 ensuring as indicated the closure between lid 11 and casing 10. Inside the latter, battery 9 rests on a ring 14 and terminal 15 of the battery may pass freely in the central space of this ring as well as in a hole 16 provided in the bottom of the casing which permits the housing of a spring wire 17 ensuring an electrical connection between terminal 15 and the exterior electrode 18 of the casing. On the other hand, at the upper part of the battery, when the lid is closed the other electrode 15′ establishes a contact with the conductive element 19 fixed below lid 11. At this moment the conductive element 19 is as indicated in contact with a second conductive element 18′ fixed to a vertical wall of the casing and constituting the second external electrode to which electrical connections will be soldered. An appropriate depression is made in the casing in order to take into account the thickness of the conductive elements 19 and 18′ while ensuring a good contact between the latter. Eventually this may be avoided by keeping the sufficiently flexible ends for the elements 19 and 18′ which have to contact one another and by housing them completely inside the casing.

If the batteries are inadvertently inserted in the opposite sense since terminal 15′ is wider than 15 it cannot be housed in the centre of the ring 14 contrary to terminal 15′, the latter will thus prevent the closure of lid 11 and an electrical connection between the elements 19 and 18′ cannot be established and consequently a reversed current cannot be established between 18 and 18′.

While the principles of the invention have been described above in connection with specific apparatus, it is to be clearly understood that this description is made only by way of example and not as a limitation on the scope of the invention.

We claim:

1. A field telephone system comprising a first group of lines serving transistorized subsets having voice frequency ringing oscillators and second group of lines serving subsets having low frequency ringers, converter means connected between lines of said first group and said second group for enabling calling lines in said first group to signal called lines in said second group and calling lines in said second group to signal called lines in said first group, said converter means comprising high pass filter means included in the path connecting said calling and called lines for providing a speech path between said calling and called lines, and control means bridging said filter means operated responsive to actuation by calling lines in said first group of lines for providing low frequency ringing signals to called lines in said second group of lines and operated responsive to actuation by calling lines in said second group of lines for providing voice frequency ringing signals to called lines in said first group of lines.

2. In the field telephone system of claim 1 wherein said control means comprises converter voice frequency oscillator means connected to lines of said first group and low frequency oscillator means connected to lines of said second group, first receiver means operated responsive to low frequency ringing signals received from calling lines of said second group for actuating said converter voice frequency oscillator means to transmit voice frequency ringing signals over called lines in said first group, and second receiver means operated responsive to voice frequency signals received over calling lines of said first group for actuating said low frequency oscillator means to transmit low frequency ringing signals over called lines in said second group.

3. In the field telephone system of claim 2 wherein the said subsets serviced by said second group of lines are powered by local battery, means responsive to the operation of said first receiver means for disabling said second receiver means, and means responsive to the operation of said second receiver means for disabling said first receiver means.

4. The field telephone system of claim 3 and means responsive to the operation of the second receiver for interrupting the connection between said filter and the lines of said first group of lines connected thereto.

5. In the field telephone system of claim 2 wherein the said subsets serviced by said second group of lines are powered by central battery, means responsive to the actuation of said converter voice frequency oscillator means for operating said second receiver means and binary circuit means operated responsive to the operation of said second receiver means for closing the D.C. loop for the central battery circuit and disabling said first receiver means.

6. In the field telephone system of claim 5, wherein said binary circuit means comprises stepping switch means, means for electrically coupling the odd terminals of said stepping switch means for electrically coupling the even terminals of said stepping switch means to provide bistable means operated to each of two stable states responsive to successive operations of said second receiver means, means including said stepping switch odd terminals for enabling the operation of said first receiver means when said stepping switch means is in said first stable state and means including said stepping switch means even terminals for completing the said D.C. loop when said stepping switch means is operated to step responsive to the termination of operation of said second receiver means from said first stable state to said second stable state and from said second stable state to said first stable state.

7. In the field telephone system of claim 6 wherein means are provided for terminating the operation of said converter voice frequency oscillator responsive to the end of low frequency ringing signals from said second group of lines.

8. The field telephone system of claim 7 and indicator means operated responsive to the closing of said D.C. loop to indicate said closing.

References Cited by the Examiner

UNITED STATES PATENTS

| | | | |
|---|---|---|---|
| 2,299,257 | 10/1942 | Simon | 179—90.5 |
| 2,590,804 | 3/1952 | Vitale | 136—166.1 |
| 2,626,996 | 1/1953 | Brown | 179—16.45 |
| 2,700,695 | 1/1955 | Gottshall | 136—166.1 |
| 2,707,211 | 4/1955 | McAdams | 179—16.45 |
| 2,834,837 | 5/1958 | Bender | 179—90.5 |
| 2,949,507 | 8/1960 | Lewis et al. | 179—90.5 |
| 2,951,909 | 9/1960 | Bauman | 179—90.5 |
| 3,156,775 | 11/1964 | Ioakimidis et al. | 179—16.45 |

KATHLEEN H. CLAFFY, *Primary Examiner.*

WALTER L. LYNDE, ROBERT H. ROSE, *Examiners.*

H. BOOHER, H. ZELLER, *Assistant Examiners.*